(12) United States Patent
Rankin et al.

(10) Patent No.: US 8,866,604 B2
(45) Date of Patent: Oct. 21, 2014

(54) SYSTEM AND METHOD FOR A HUMAN MACHINE INTERFACE

(71) Applicant: Ford Global Technologies, LLC, Dearborn, MI (US)

(72) Inventors: James Stewart Rankin, Novi, MI (US); Basavaraj Tonshal, Northville, MI (US); Pietro Buttolo, Dearborn Heights, MI (US); Yifan Chen, Ann Arbor, MI (US); Gary Steven Strumolo, Canton, MI (US); Jeffrey Allen Greenberg, Ann Arbor, MI (US); Dimitar Petrov Filev, Novi, MI (US); Krishnaswamy Venkatesh Prasad, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 13/767,303

(22) Filed: Feb. 14, 2013

(65) Prior Publication Data

US 2014/0225724 A1    Aug. 14, 2014

(51) Int. Cl.
*B60Q 1/00* (2006.01)
*G06F 3/048* (2013.01)

(52) U.S. Cl.
CPC ...................................... *G06F 3/048* (2013.01)
USPC ...................................... 340/438; 340/539.11

(58) Field of Classification Search
USPC ................. 340/438, 870.01, 988, 993, 995.1, 340/995.12, 995.17, 539.11; 348/837, 839; 704/231; 455/563, 41.2, 403; 701/1, 36
See application file for complete search history.

(56) References Cited

U.S. PATENT DOCUMENTS

| | | |
|---|---|---|
| 5,467,070 A | 11/1995 | Drori et al. |
| 5,513,107 A | 4/1996 | Gormley |
| 5,627,510 A | 5/1997 | Yuan |
| 5,635,916 A | 6/1997 | Bucholtz et al. |
| 5,828,319 A | 10/1998 | Tonkin et al. |
| 5,978,834 A | 11/1999 | Simonoff et al. |
| 6,018,291 A | 1/2000 | Marble et al. |
| 6,177,866 B1 | 1/2001 | O'Connell |
| 6,198,996 B1 | 3/2001 | Berstis |

(Continued)

FOREIGN PATENT DOCUMENTS

| | | |
|---|---|---|
| CN | 101596895 | 12/2009 |
| DE | 102007046270 | 4/2009 |

(Continued)

OTHER PUBLICATIONS

Autobiometrics, COM, US Distributor for ATRD Biometric Immobilizer, http://www.autobiometrics.com, Jul. 6, 2011.

(Continued)

*Primary Examiner* — Toan N Pham
(74) *Attorney, Agent, or Firm* — Jennifer M. Stec; Brooks Kushman P.C.

(57) ABSTRACT

A vehicle computer system comprising a wireless transceiver configured to send a nomadic device human machine interface to a nomadic device in a web browser format. The vehicle computer system further comprises a vehicle server utilizing a contextual data aggregator that utilizes vehicle data and off-board data to generate a dynamic human machine interface, the server further configured to generate an in-vehicle human machine interface for output on a vehicle display and generate the nomadic device human machine interface for the nomadic device to display.

20 Claims, 6 Drawing Sheets

(56) References Cited

U.S. PATENT DOCUMENTS

| | | |
|---|---|---|
| 6,263,282 B1 | 7/2001 | Vallancourt |
| 6,268,804 B1 | 7/2001 | Janky et al. |
| 6,271,745 B1 | 8/2001 | Anzai et al. |
| 6,434,455 B1 | 8/2002 | Snow et al. |
| 6,434,486 B1 | 8/2002 | Studt et al. |
| 6,438,491 B1 | 8/2002 | Farmer |
| 6,574,734 B1 | 6/2003 | Colson et al. |
| 6,590,495 B1 | 7/2003 | Behbehani |
| 6,640,169 B2 | 10/2003 | Bergmann et al. |
| 6,679,702 B1 | 1/2004 | Rau |
| 6,690,260 B1 | 2/2004 | Ashihara |
| 6,737,963 B2 | 5/2004 | Gutta et al. |
| 6,741,931 B1 | 5/2004 | Kohut et al. |
| 6,754,562 B2 | 6/2004 | Strege et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,207,041 B2 | 4/2007 | Elson et al. |
| 7,228,213 B2 | 6/2007 | Sakai et al. |
| 7,266,438 B2 | 9/2007 | Kellum et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,480,709 B2 | 1/2009 | Callaghan |
| 7,593,792 B2 | 9/2009 | Berg et al. |
| 7,602,782 B2 | 10/2009 | Doviak et al. |
| 7,672,757 B2 | 3/2010 | Hong et al. |
| 7,756,966 B2 | 7/2010 | Callaghan |
| 7,812,712 B2 | 10/2010 | White et al. |
| 8,050,817 B2 | 11/2011 | Moinzadeh |
| 8,185,220 B2 | 5/2012 | Lloyd |
| 8,185,274 B2 | 5/2012 | Garg |
| 8,447,598 B2 * | 5/2013 | Chutorash et al. ............ 704/231 |
| 8,750,832 B2 * | 6/2014 | Wuergler et al. ............ 455/411 |
| 2002/0097145 A1 | 7/2002 | Tumey et al. |
| 2003/0079123 A1 | 4/2003 | Mas Ribes |
| 2003/0217148 A1 | 11/2003 | Mullen et al. |
| 2004/0046452 A1 | 3/2004 | Suyama et al. |
| 2004/0124968 A1 | 7/2004 | Inada et al. |
| 2004/0227642 A1 | 11/2004 | Giles et al. |
| 2004/0236475 A1 | 11/2004 | Chowdhary |
| 2005/0021597 A1 | 1/2005 | Derasmo et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama et al. |
| 2005/0193212 A1 | 9/2005 | Yuhara |
| 2005/0261816 A1 | 11/2005 | DiCroce et al. |
| 2006/0056663 A1 | 3/2006 | Call |
| 2006/0150197 A1 | 7/2006 | Werner |
| 2006/0156315 A1 | 7/2006 | Wood et al. |
| 2007/0050854 A1 | 3/2007 | Cooperstein et al. |
| 2007/0100514 A1 | 5/2007 | Park |
| 2007/0103339 A1 | 5/2007 | Maxwell et al. |
| 2008/0109653 A1 | 5/2008 | Yokohama |
| 2008/0132246 A1 | 6/2008 | Sandhu et al. |
| 2008/0148374 A1 | 6/2008 | Spaur et al. |
| 2008/0275604 A1 | 11/2008 | Perry et al. |
| 2009/0167524 A1 | 7/2009 | Chesnutt et al. |
| 2009/0195370 A1 | 8/2009 | Huffman et al. |
| 2009/0309709 A1 | 12/2009 | Bevacqua et al. |
| 2010/0004818 A1 | 1/2010 | Phelan |
| 2010/0007479 A1 | 1/2010 | Smith |
| 2010/0039224 A1 | 2/2010 | Okude et al. |
| 2010/0057586 A1 | 3/2010 | Chow |
| 2010/0097178 A1 | 4/2010 | Pisz et al. |
| 2010/0148923 A1 | 6/2010 | Takizawa |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0105097 A1 | 5/2011 | Tadayon et al. |
| 2011/0106374 A1 | 5/2011 | Margol et al. |
| 2011/0177774 A1 | 7/2011 | Gupta et al. |
| 2011/0213629 A1 | 9/2011 | Clark et al. |
| 2011/0234427 A1 | 9/2011 | Ingram et al. |
| 2011/0295444 A1 | 12/2011 | Westra et al. |
| 2012/0139760 A1 | 6/2012 | Bevacqua et al. |
| 2012/0179325 A1 | 7/2012 | Faenger |
| 2012/0284702 A1 | 11/2012 | Ganapathy et al. |

FOREIGN PATENT DOCUMENTS

| | | |
|---|---|---|
| JP | 2008195253 | 8/2008 |
| JP | 2008303630 | 12/2008 |
| WO | 0125572 | 4/2001 |
| WO | 0233529 A2 | 5/2002 |

OTHER PUBLICATIONS

Kermit Whitfield, "A hitchhiker's guide to the telematics ecosystem," Automotive Design & Production, Oct. 2003, http://findarticles.com, pp. 103.

Ford Motor Company, "SYNC," Owner's Guide Supplement, SYNC System Version 3 (Aug. 2009).

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Dimitar Filev & Davor Hrovat, Virtual Transportation Web: Vehicle to Cloud to Vehicle (V2C2V) Control System, Jun. 6, 2011.

Andy Gryc and Kerry Johnson, QNX Software Systems, Why Automakers (Should) Care about HTML5, 2011.

James Trew, QNX unveils Jeep Wrangler reference vehicle for off-road Facebookers, Jun. 7, 2012, www.engadget.com/2012/06/07/qnx-unveils-jeep-wrangler-reference-vehicle/.

Kerry Johnson, QNX Auto Blog, Moving beyond the browser: HTML5 as an automotive app environment, Jun. 11, 2012.

Andy Gryc, QNX Auto Blog, Everything you wanted to know about HTML5 in the car, Part I, Feb. 13, 2012.

Kerry Johnson, HTML5 for automotive infotainment: What, why, and how? Jan. 8-9, 2012.

BSQUARE, Developing In-Vehicle Infotainment Systems, Forging Smart Connections, 2011.

* cited by examiner

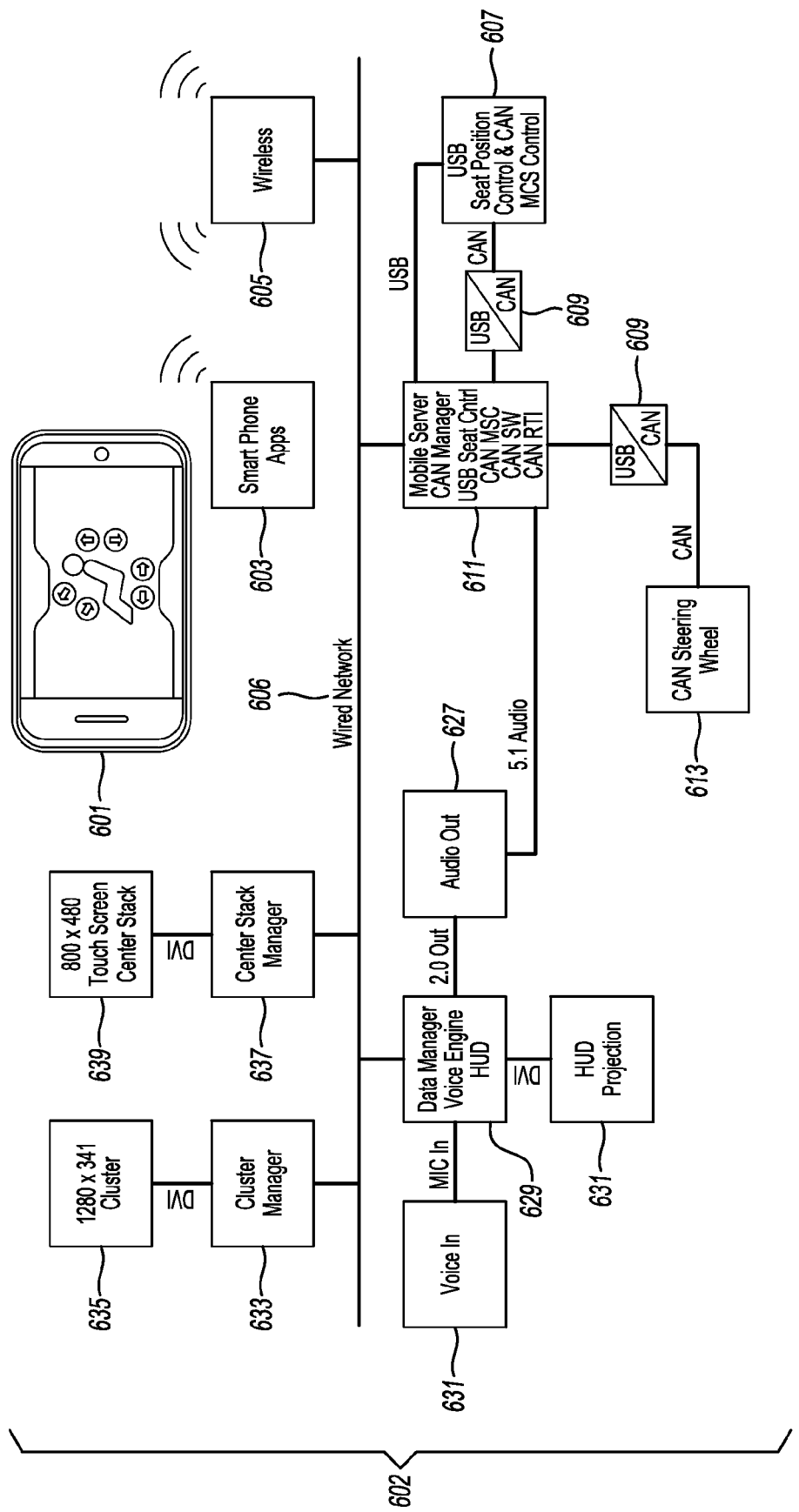

SYSTEM AND METHOD FOR A HUMAN MACHINE INTERFACE

TECHNICAL FIELD

The illustrative embodiments generally relate to an apparatus and method for generating a user interface in a vehicle multimedia system.

BACKGROUND

Below, a few prior art entertainment systems are described. Additional device usage of these systems may be obtained and described from the identified references below.

United States Patent Publication 2011/0234427, now U.S. Pat. No. 8,624,758, describes a telemetric device for a vehicle that includes a location determining device arranged to determine the vehicle's location and a transmitting device arranged to continuously or nearly continuously transmit location data concerning the vehicle in real-time or near real-time. The transmission of the location data is not based on a condition of the vehicle and is without prompting by a user.

United States Patent Publication 2011/0234427, now U.S. Pat. No. 8,204,734 describes an exemplary system that includes a development subsystem configured to facilitate development of a software application and a simulation subsystem selectively and communicatively coupled to the development subsystem. The simulation subsystem is configured to emulate a plurality of processing device platforms, receive data representative of a selection of at least one of the plurality of processing device platforms, and simulate an execution of the software application by one or more processing devices associated with the at least one selected processing device platform.

United States Patent Publication 2012/0179325, now U.S. Pat. No. 8,688,320, describes an information system located within a vehicle that includes a data storage device configured to store programmed instructions to implement a web browser, a data communication module, and a controller operatively coupled to the data storage device, and the data communication module, the controller configured to execute the web browser to receive a plurality of data elements, identify a respective content type for each of the plurality of data elements, assign a relevance level to each of the plurality of data elements based on the respective identified content type, compare the assigned relevance to a predetermined relevance threshold; and generate a user interface using at least one of the plurality of data elements based upon the comparison.

SUMMARY

A first illustrative embodiment discloses a vehicle computer system comprising a wireless transceiver configured to establish a connection with a nomadic device, wherein the wireless transceiver is further configured to send a nomadic device human machine interface configured for output on the nomadic device using a first web browser format. The vehicle computer system also includes a vehicle display configured to output an in-vehicle human machine interface using a second web browser format for controlling various vehicle functions and a vehicle server configured to generate the in-vehicle human machine interface for the vehicle display and generate the nomadic device human machine interface for the nomadic device.

A second illustrative embodiment discloses an off-board computer system comprising a wireless transceiver communicating with a vehicle and a server that includes a contextual data aggregator which utilizes vehicle data retrieved from the wireless transceiver and off-board data to generate a dynamic contextual human machine interface based on the vehicle data and off-board data in a web browser data format to be sent to the vehicle utilizing the wireless transceiver.

A third illustrative embodiment discloses a vehicle computer system comprising a wireless transceiver configured to send a nomadic device human machine interface to a nomadic device in a web browser format. The vehicle computer system further comprises a vehicle server utilizing a contextual data aggregator that utilizes vehicle data and off-board data to generate a dynamic human machine interface, the server further configured to generate an in-vehicle human machine interface for output on a vehicle display and generate the nomadic device human machine interface for the nomadic device to display.

BRIEF DESCRIPTION OF THE DRAWINGS

FIG. 5A is an illustrative embodiment of a network architecture utilized to demonstrate a remote control employed to control a seat using a mobile application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

Many new features and functionality are packed into our phones, tablets, MP3 players, etc. However, many of these features are not developed with the vehicle environment in mind. Increasing interoperability of mobile devices with a vehicle's computing system allows customers to have a seamless experience whether or not they are in a vehicle environment. One illustrative example of a seamless customer experience is allowing a user to operate a user interface related to the vehicle on a user's nomadic device. This may allow a user to control a vehicle computer system from multiple devices and in different locations, both within the vehicle and outside of the vehicle.

Figure 1:
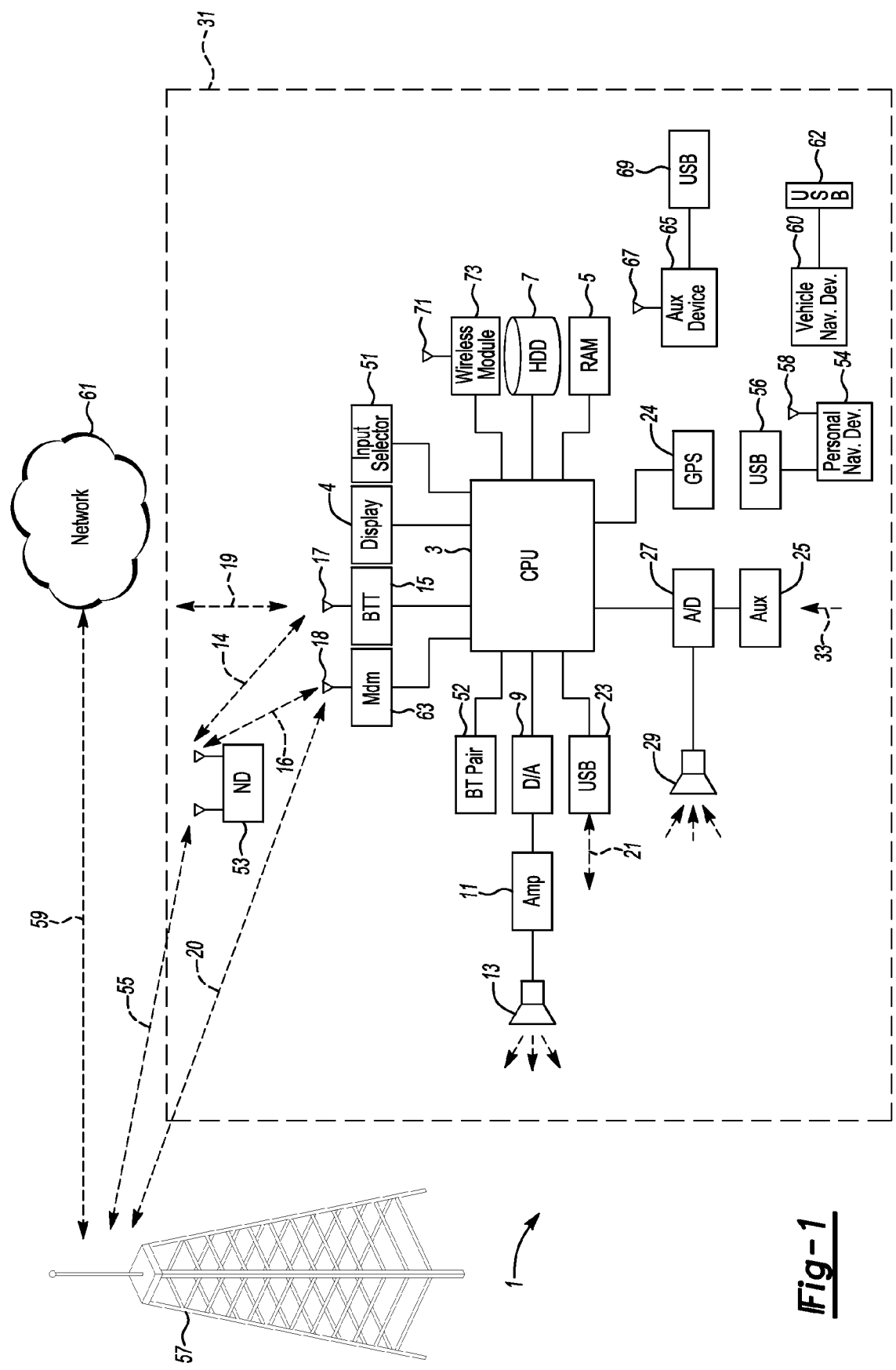
FIG. 1 shows an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by FORD MOTOR COMPANY. A vehicle enabled with a vehicle-based computing system may contain a visual front end interface 4 located in the vehicle. The user may also be able to interact with the interface if it is provided, for example, with a touch sensitive resistive/capacitive buttons that may also be utilized on a display screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
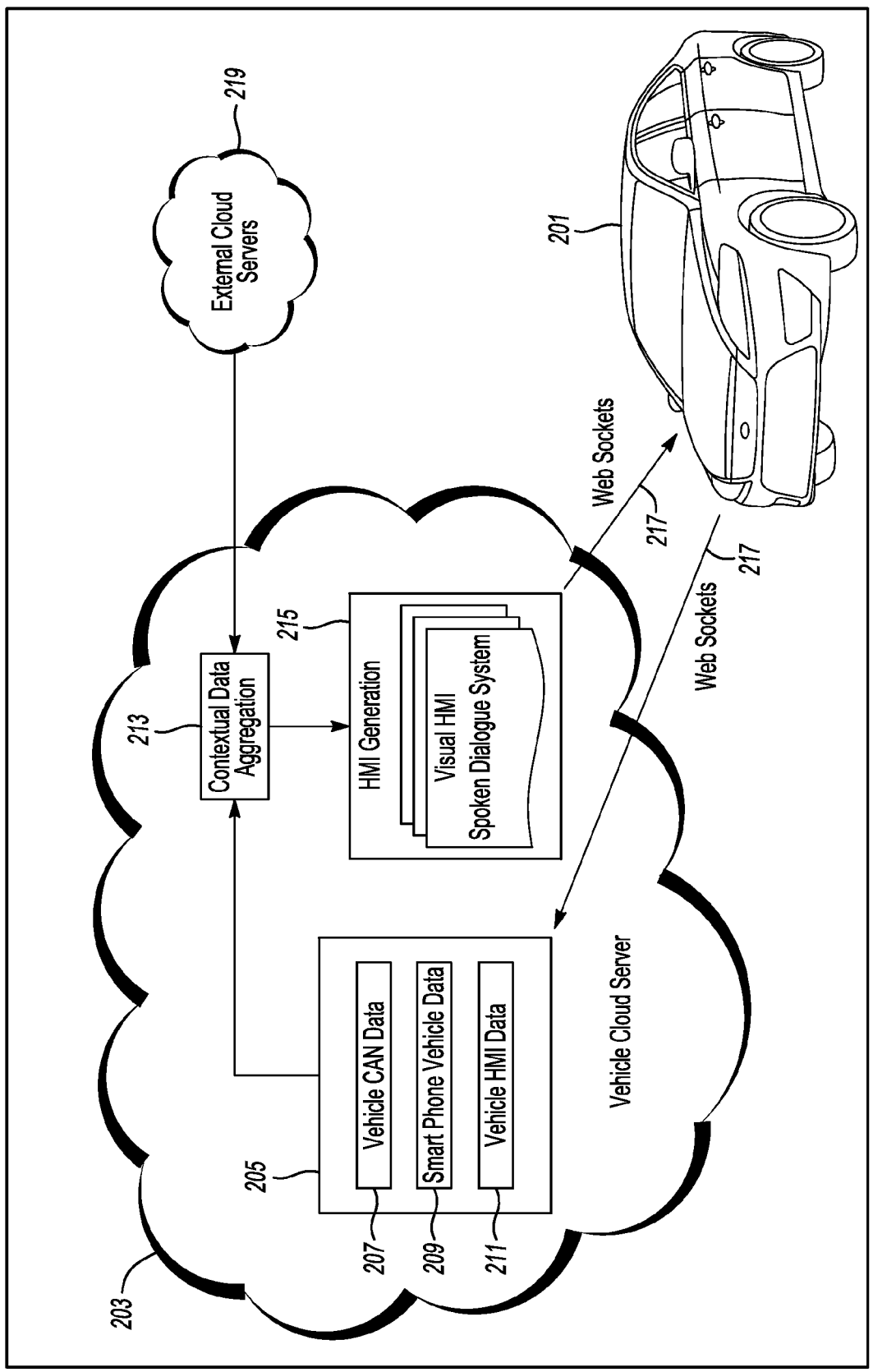
FIG. 2 shows an example topology of the vehicle based computing system communicating with a cloud based server configured with contextual data aggregation.

FIG. 2 shows an example topology of the vehicle communicating with the cloud to communicate different data from various sources. The vehicle server in the cloud may allow for the management and utilization of the data. The server may also be located outside of the vehicle, or in the cloud. The server may be located in the vehicle and may utilize hardware and/or software to deliver web content to be accessed through the internet or via a TCP/IP connection. The server may deliver requests to various clients using HTTP or other means of delivering HTML documents and additional content such as images, scripts, etc. The server's data may be updated and aggregated. The data may come from a large community in the cloud. The server may also provide data synthesis, such as utilizing contextual information for extraction. Additionally, the vehicle server in the cloud may allow for intelligence and decision making by utilizing an agent in the cloud. The vehicle server may be aware of a destination point, thus the server may utilize the agent to proactively engage the driver in delivering weather at a user's set destination point.

Real-time, by-directional data streaming between a vehicle and the vehicle server, and between a mobile device and the vehicle server, may be accomplished through the illustrative embodiment disclosed. Relevant vehicle CAN and vehicle to smartphone (V2SP) interaction data may be uploaded to the server. The data may be utilized to create a contextual HMI that can be generated in real time at the server, using the contextual data aggregator. The contextual HMI may be served to one or more clients, such as a vehicle, a device in the vehicle, or another module/display. Websockets may be utilized to provide the communication channel. The websocket specification, developed as part of the HTML5 initiative, introduced the WebSocket JavaScript interface. The websocket interface allows a full-duplex single socket connection in which messages can be sent between a client and server. The websocket standard simplifies much of the complexity around bi-directional web communication and connection management. The use of web sockets makes it possible for real time updating of the context-based HMI for different user scenarios. One example of a particular user scenario may include displaying climate for various situations on the vehicle display interface. For example, the car area network (CAN) may have access to climate information that is available via a climate data source that is off-board from the vehicle and the vehicle server. Thus, the vehicle computer system may be configured to display the destination climate by utilizing the climate data from the off-board server, various data from the vehicle, and the contextual data aggregator. Furthermore, it may be capable of providing weather information at the driver's residence or a way-point. The climate data may be fetched from a vehicle cloud server via a persistent websocket connection with the vehicle cloud server at the time of visual interface rendering. This may allow for different HMI interfaces to be utilized on one's mobile nomadic device versus an on-board vehicle system, such as MYFORD TOUCH. Furthermore, it enables for direct interaction between devices and a server. The user may be allowed to interact directly with either the mobile device or the relayed-HMI on the vehicle's on-board system.

The vehicle based computing system 201 of FIG. 2 may be capable of communicating with a vehicle cloud server 203. The vehicle based computing system may connect to the vehicle cloud server 203 via a Bluetooth cell phone paired with the vehicle system, an embedded cellular connection, and/or both a long-range/short-range wireless connection. The vehicle cloud server 203 may also be accessible by other nomadic devices or computer systems. Additionally, accessibility may require various security restrictions in order to allow for access to the vehicle cloud based server. The vehicle may send different types of relevant data to the server utilizing web sockets 217. This allows for full-duplex communication channels via a single TCP connection. Thus a web browser or web server of a client or server application may utilize the websocket API to facilitate live real-time updating of content. Although the websocket API and protocol are utilized in this example, other similar alternative embodiments may be utilized.

The vehicle cloud server 205 may store a variety of vehicle and user related data on a database 205 of the server. In the illustrative embodiment disclosed, the database 205 may include vehicle CAN data 207, smart phone vehicle data 209, and vehicle HMI data 211. The vehicle CAN data 207 may be utilized for utilizing data associated with the vehicle system and performance. Thus it could provide driver history, vehicle diagnostic, and maintenance data. The relevant vehicle CAN data may be uploaded into the server. Furthermore, data related to the vehicle and smart phone interaction 209 may also be stored on the same server. The smart phone vehicle data 209 may be utilized for identifying contacts, the user device, etc. The vehicle computer system may interface with more than one device brought into the vehicle. Thus the vehicle server may help prepare the device to work with the vehicle system. The vehicle HMI data 211 may be utilized for storing user settings, providing voice recognition data, and data related to interaction carried while driving, such as but not limited to advertisement bookmarks, location bookmarks, and entertainment preferences. Although the illustrative embodiments shows the database including vehicle CAN data, smart phone vehicle data, and vehicle HMI data, other data may be stored. For example, the database 205 may store the vehicle manufacturer data and more.

Content may also be provided by the external cloud servers 219. Some examples of off-board data that the external cloud servers may have access to is traffic data, navigation/direction/routing data, music content, dealership/vehicle maintenance data, weather content, social interaction data gathered from social networks like Google Plus, Facebook, Path, Twitter, etc. The external cloud server may provide additional data to help enhance the contextual HMI generation. The external cloud server may help provide location specific information, such as Point of Interest (POI) information (hours, location, menu, ratings, etc.), traffic, weather, etc.

The vehicle cloud server 203 may utilize different computer processing to provide contextual data aggregation 213. The vehicle may leverage the additional resources that the vehicle cloud server 203 provides in order to deliver enhanced user experience for the driver. For example, in one illustrative embodiment, the vehicle server may utilize the user's cell phone number, make, and model to identify the capability of the device and prepare the HMI for the device. The vehicle based computing system may obtain this data from the user's cell phone once the Bluetooth phone has been paired with the vehicle. Furthermore, by utilizing additional data, such as the vehicle CAN data and the vehicle HMI data, the server may generate a unique HMI for the current user's device. The HMI generation 215 may be accomplished through algorithms and formulas utilized by the contextual data aggregator 213. Both a unique visual HMI and spoken dialogue system may be generated on the cloud server to be presented to the user. Numerous combinations of different data may be utilized to provide the output of the contextual HMI. The different combinations of the data allows for updates of applications to be available. Additionally, it allows for very fast integration of new applications and use cases in the vehicle based computing system. The HMI data may be generated in real time on the server based on the contextual data aggregator. The HMI data may also be served to the client, which in one embodiment, may be the vehicle. In an alternative embodiment, the client maybe a nomadic device that is either located within the vehicle or located remote from the vehicle. Once generated by the contextual aggregator of the server, the server may send the necessary data to the vehicle via web sockets 217. The web sockets help facilitate the real time updating of a context-based HMI data.

Figure 3:
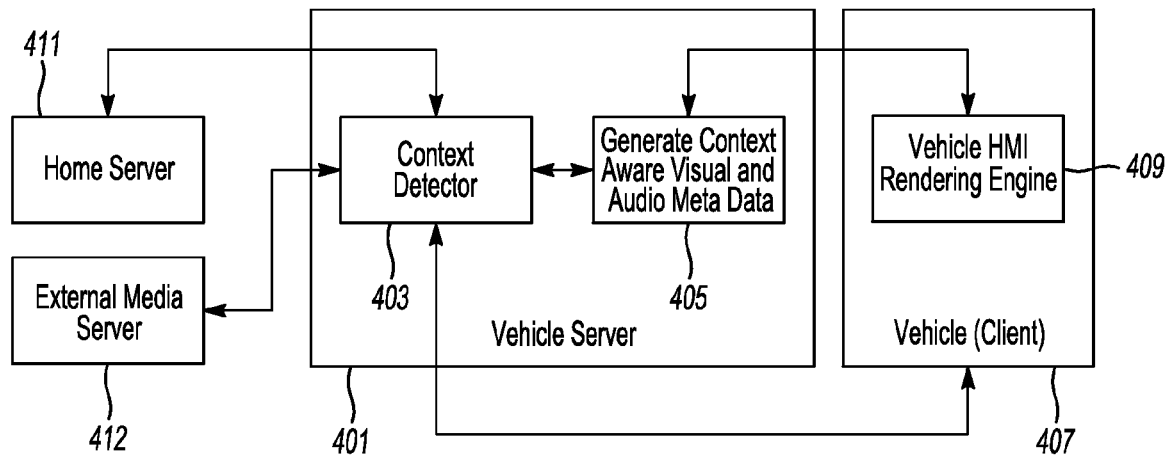
FIG. 3 is an example of the vehicle cloud human machine interface utilizing the context detector.

FIG. 3 illustrates another illustrative embodiment of the vehicle server utilizing an entirely off-board solution. The vehicle's cloud HMI may utilize different web standards to create a vehicle server. The vehicle server 401 may be located at the vehicle, off-board, or utilize a hybrid approach that has certain software features located at the vehicle and others located off-board. An off-board or cloud based solution may allow for servers with high processing power to aggregate and transform data in an efficient manner, however, connections off-board may not always be available in certain circumstances (i.e. no signal or service for a long-range connection). Thus an on-board solution may also be utilized for the vehicle server. The on-board vehicle server may also include a context detector 403 and software to generate context aware visual and audio metadata 405. The vehicle server may not only utilize vehicle sensor data, but also utilize other relevant information from off-board servers and other devices or sensors not embedded in the vehicle.

The vehicle server 401 may also utilize the context detector 403 to understand the environment in which the vehicle or other client is operating in. Furthermore, the context detector may determine the environment in view of the different clients or devices which are in communication with the vehicle server. The vehicle cloud server may be in communication with an embedded vehicle server or with a nomadic device, thus the context detector has to determine the context for suitable HMI rendering. The context detection may be done entirely in the cloud based on vehicle sensor data and other relevant data. For example, if a driver is approaching home and the vehicle server knows this information and generates an HMI, it may send it to the vehicle. The visual HMI display may have a screen for operation of the home's garage door. Although context detection exists in the cloud for the present embodiment, both on-board vehicle solutions and hybrid solutions are alternative embodiments.

The vehicle server 401 may operate similar to a web server with web socket support. The vehicle HMI renderer may simply be a modern browser that, for example, supports HTML 5 and web sockets. The vehicle may send data located within the vehicle data bus or on vehicle sensors, such as vehicle speed, location, etc, to the vehicle server. The vehicle cloud server may use this data for context detection and drive pattern recognition. The vehicle embedded browser may utilize the data to render the HMI for the user. In an alternative embodiment, a graphics rendering application may be utilized to render the HMI, rather than a browser. The application may be utilized to mitigate or eliminate rendering of a page on a browser.

The context detector 403 may be in communication with a home server 411. The home server may provide data located in a user's residence. Such data that may be utilized are home automation data, e.g. home HVAC, security, lighting and lighting status, gas status, etc. Furthermore, the context detector 403 may be in communication with an external media server 412. The external media server may utilize data such as photos, music, and video files.

Upon the context detector 403 receiving data from multiple servers and sources, the vehicle server may generate context aware visual and audio metadata 405. The metadata may then be sent to the client 407, which may be the vehicle, nomadic device, or browser on a personal computing device. The vehicle HMI rendering engine 409 may be used to generate a specific type of HMI based on the data, the client, and other factors. The HMI rendering engine may be utilized in conjunction with a web browser or an application.

In another embodiment, the hybrid approach may be utilized to render the HMI utilizing the vehicle embedded server. This may solve a potential problem if the vehicle is unable to maintain a connection with the vehicle cloud server. The vehicle HMI rendering engine maybe configured to work both with and without the vehicle cloud server, as to render the HMI when no connection to the cloud is present. This hybrid architecture may be ideally suitable for vehicle HMI rendering when a connection to the server is not always available.

Figure 4:
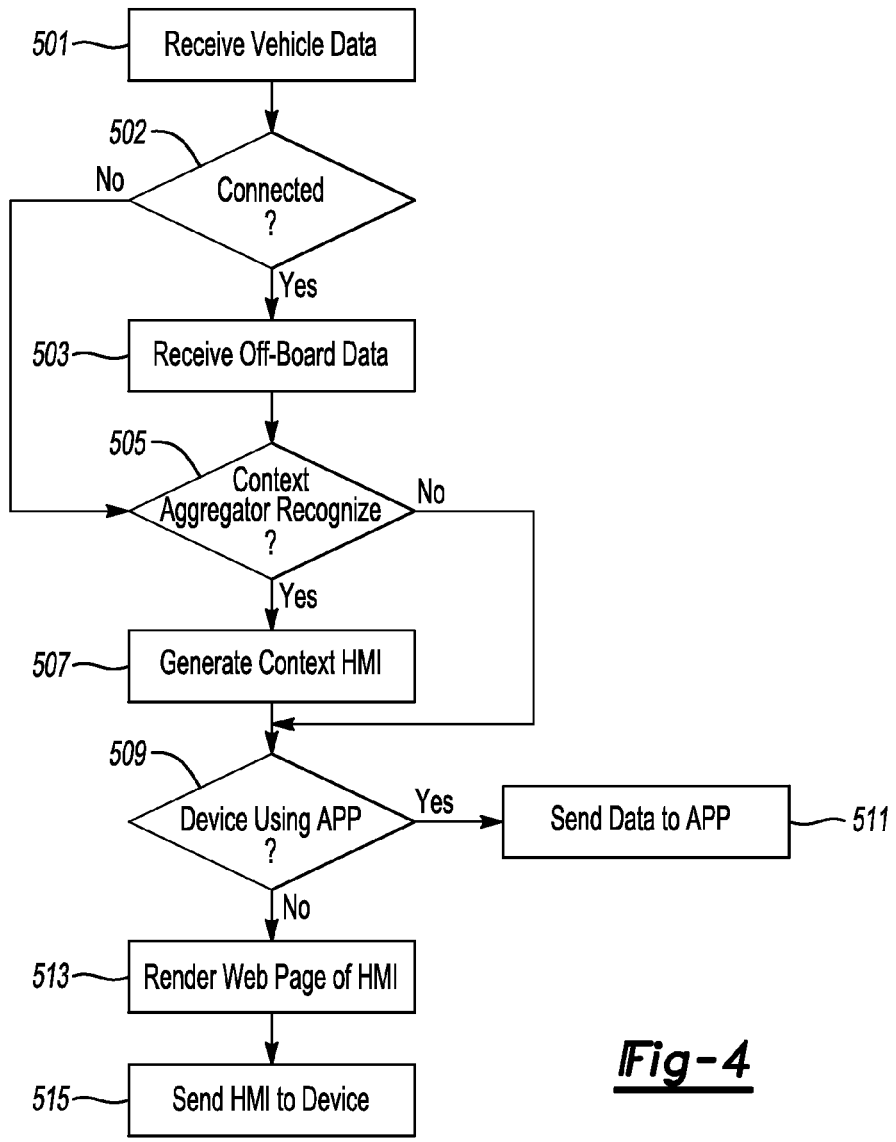
FIG. 4 is an example of a flow chart indicating the interaction of the vehicle based computing system.

FIG. 4 is an example of a flow chart indicating the interaction of the vehicle based computing system. The vehicle based computing system may be equipped with either an on-board, off-board, or hybrid (combination of on-board and off-board) server. Thus any combination or all of the steps may be performed either within the vehicle, outside of the vehicle in a cloud, or a hybrid combination that utilizes processing of both on-board and off-board solutions. The server may retrieve vehicle data 501 from various vehicle modules using a wired connection (e.g. CAN, USB, Serial, etc.) or a wireless connection (e.g. Bluetooth, Wi-Fi, Wi-Fi direct, cellular connection, etc.). In addition, the vehicle data may include media data from a user's media collection, navigation data (e.g. POI information, speed limit info, and other mapping data), and cellular phone data. The vehicle data may be utilized to output specific information on an interface (e.g. speed of the vehicle or location of the vehicle), or it could be used to generate a specific feature or interface for the HMI.

The vehicle computer system may be configured to determine if a connection is present with an off-board cloud server or data server 502. If the connection is present, the computer system may receive off-board data 503 from various data sources that are not located on or within the vehicle. These data sources may include weather, traffic, sports scores, off-board navigation data, etc. Similar to the vehicle data, the off-board data may be utilized to output specific information on the user interface (e.g. a weather map) or it could be used to generate a specific feature or interface for the HMI. The server may generate the interface to be used with a browser application.

Upon receiving the off-board data or determining that no connection is present, the vehicle computer system may utilize a contextual data aggregator. In some embodiments, the vehicle computer system may be in communication with a context aggregator that generates dynamic features and context based on the vehicle data and/or the off-board data. The context aggregator may analyze the data 505 to determine if any dynamic features may be utilized by the interface. If the context aggregator does not recognize any features that may be dynamic, it may use the static HMI features of the vehicle computer system. In an alternate scenario, the context aggregator may recognize that either the vehicle data or off-board data can include the possibility of the vehicle computer system to generate a dynamic feature or HMI 507. In one scenario, the context aggregator may receive data indicating that the vehicle is in motion and is located on a road with traffic. Thus, the aggregator may utilize the data to display on the user interface a screen asking a user to reroute around the traffic. In another scenario, the context aggregator may recognize the mobile phone as a secondary driver and display a user interface tailored to that driver's need. For example, a certain skin or graphic may be used and presets may be stored based on the driver. If no contextual use-case or data is present, the system may simply generate a static HMI to be rendered on a vehicle system. Additionally, the HMI may be customized for features that the particular user uses most frequently. The contextual aggregator may be located off-board from the vehicle, on-board, or utilize a hybrid solution.

The vehicle computing system may determine whether a nomadic device that is connected to the vehicle computing system is utilizing an application 509. Utilization of an application by a nomadic device may eliminate the need for the server to generate the web page. Instead, if the nomadic device is determined to be using a use interface application for the vehicle, the server may simply send the relevant data for the nomadic device's HMI 511. The data may be in the form of any data type, such as a JSON (JavaScript Object Notation). Thus, the page will be pre-rendered prior to the relevant vehicle data being sent from the nomadic device. The nomadic device will utilize any relevant data to output the necessary information to be displayed on the user interface. Additionally, the application may be tailored for a specific user-case scenario of driver or passenger, such as an application to adjust the seating controls of the vehicle.

If the vehicle computing system determines that the device is not using an application for the user interface, the device may request the vehicle embedded server for the rendered HMI that may be in the form of a web page. The vehicle computer system may render the web page of the HMI 513 utilizing an on-board, off-board, or hybrid solution. Upon rendering the HMI, the vehicle computer system may send the HMI to the nomadic device 515. The device may use a web browser conforming to the protocols of the server in order to request or load the HMI, which may be in the form of a web page. The web page may be chrome-less, meaning that a browser chrome does not have to be shown. The browser may utilize a rendering engine, Java Script, and browser plug-ins to enhance the user experience. Furthermore, any of the data that is used by the vehicle computer system may be utilized to generate the HMI.

FIG. 5A is an illustrative embodiment of a network architecture utilized to demonstrate a smart phone employed to control a seat. A nomadic device 601 may be brought into the vehicle. The nomadic device may or may not have a vehicle interface application 603 running in order to utilize a human machine interface (HMI) for various vehicle controls. The smart phone may allow the browser to request vehicle HMI web pages from the vehicle embedded server. Further, the nomadic device may be utilized to control various parts, components, or modules of the radio. In the embodiment described below, the application is utilized to operate the functionality of a seat. However, any and all modules, components, or computers of the vehicle may be utilized. Some examples include, but are not limited to, the radio, navigation, system, sun roof, moon roof, trunk, lights, etc. This embodiment demonstrates a wireless transceiver 605 communicating with the nomadic device. Various wireless transceivers may include a Wi-Fi transceiver, Bluetooth transceiver, near field communication (NFC), infrared, etc. Although a wireless transceiver is shown in the embodiment for the vehicle to communicate with the nomadic device, a wired solution (e.g. USB, Serial, CAN, Firewire, etc.) may be possible. Data communication between the nomadic device 601 and the wireless transceiver 605 may be established when security has been authorized. Devices may utilize a pairing sequence of generating a random number and matching with the vehicle computer system, or vice versa. Additionally, the vehicle or device may require a button to be pressed at a certain moment for a certain amount of time in order to establish a connection. Additionally, NFC may utilize RFD tags to establish communication.

The wireless transceiver may be in direct communication with the vehicle network 606. A vehicle computer may include a vehicle embedded server 611 and a CAN/USB manager to communicate data throughout the vehicle network infrastructure 602. Although the vehicle embedded server 611 may include a CAN Manager and a USB Seat Controller, they each may be separate individual modules in other embodiments. The infrastructure 602 may utilize wireless signals to communicate, or it may utilize a wired network 606, such as a CAN, USB, DVI, etc. The vehicle embedded server 611 may be in communication with one or more USB or CAN transceivers 609 to communicate with other modules. In turn, the transceiver 609 may be in communication with a seat & position control module 607. The seat & position control module may communicate data back and forth to the vehicle network infrastructure 602. The data may be utilized to allow a user to control seat positions on a nomadic device 601 like a mobile phone.

Further, vehicle embedded server 611 may generate or output HMI to the various displays of the vehicle, such as on the display of nomadic device 601. The vehicle embedded server may additionally be connected to the off-board vehicle cloud servers to communicate various data, such as off-board data, a standard user interface, or a contextual user interface. The server 611 maybe output sound or music through the vehicle speakers 627 utilizing DSP, 5.1, THX, or other audio compression technology.

The steering wheel controls 613 may also be able to communicate data to the server 611 and other devices within the VCS. The steering wheel may allow for flexibility in controlling the user interface while allowing a driver to safely operate the vehicle. The steering wheel controls 613 may control only some of the display's user interfaces or every different user interfaces within the vehicle.

Another vehicle computer 629 may include an application acting as a data manager, HUD module, and a voice recognition engine. The data manager may be utilized to facilitate in the transmission of relevant CAN data to the various vehicle modules. The voice recognition engine can provide the ability of user commands to be spoken and input via MIC 631. The voice recognition engine may use a natural language voice recognition engine and eliminate the need to speak only specific commands, but utilize contextual awareness to interpret the user's spoken commands. Thus after identifying the user's command, the voice engine will send the relevant CAN message or data to the relevant module to act on the command. The embedded vehicle server may be able to communicate with all relevant HMI interfaces in the vehicle, such as but not limited to the heads up display (HUD), Cluster, Center stack, and Voice Recognition/Spoken Dialogue systems. The voice engine 629 may output the dialogue utilizing various speakers 627 in the vehicle.

A HUD 631 may be utilized to render a specific type of user interface or to display specific data. The HUD may allow for a projection to be displayed on a vehicle's windshield in order to display relevant information within a driver's peripheral vision. The HUD can act as one of type of display in the vehicle utilizing the vehicle server's HMI.

Another type of display that may utilize the vehicle server's HMI is the vehicle cluster. The vehicle cluster may be utilized to display various vehicle information, such as speed, RPM's, fuel economy, fuel level, etc. The cluster display 635 may be in communication with a cluster manager 633. The cluster manager 633 may receive the interface data from the vehicle server to output on the cluster display 635. Furthermore, the cluster manager 633 may be capable of rendering its own HMI or facilitating data communication with other device within the vehicle network.

Another type of display that may utilize the vehicle server's HMI is the vehicle center stack. The vehicle center stack may be utilized to display various vehicle information, such as audio information, navigation information, phone information, vehicle settings, etc. The center stack display 639 may be in communication with a center stack manager 637. The center stack manager 637 may receive the interface data from the vehicle server to output on the cluster display 639. Furthermore, the cluster manager 637 may be capable of rendering its own HMI or facilitating data communication with other devices within the vehicle network.

Figure 5B:
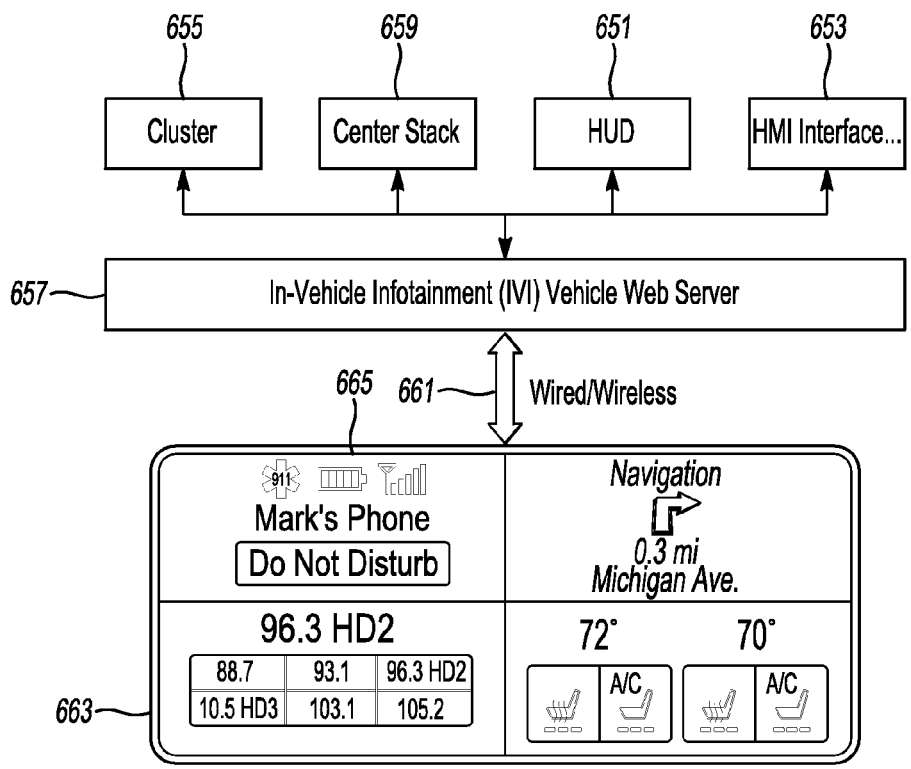
FIG. 5B is an illustrative embodiment of a network architecture utilizing various displays in the vehicle.

FIG. 5B is an illustrative embodiment of a simplified block diagram depicting the network architecture utilizing various displays in the vehicle. The vehicle computer system 657 may host a vehicle embedded server to communicate data and web pages to various devices utilizing a browser or application. Some of the displays may be hardwired, such as the vehicle cluster 655, center stack 659, HUD 651, or other display for outputting an HMI interface 653. Additionally, the web server may utilize a wired/wireless connection 661, to bring in a nomadic device 663. The nomadic device 663 may output various vehicle HMI's 665 for utilization on the nomadic device. The various devices 663 may be in communication with the vehicle web server 657 through a wired or wireless connection 661. The various displays and devices may use an application to output the relevant HMI data to output an interface 665. In another embodiment, the interface 665 may be output utilizing a nomadic device browser that renders its own page.

Figure 6:
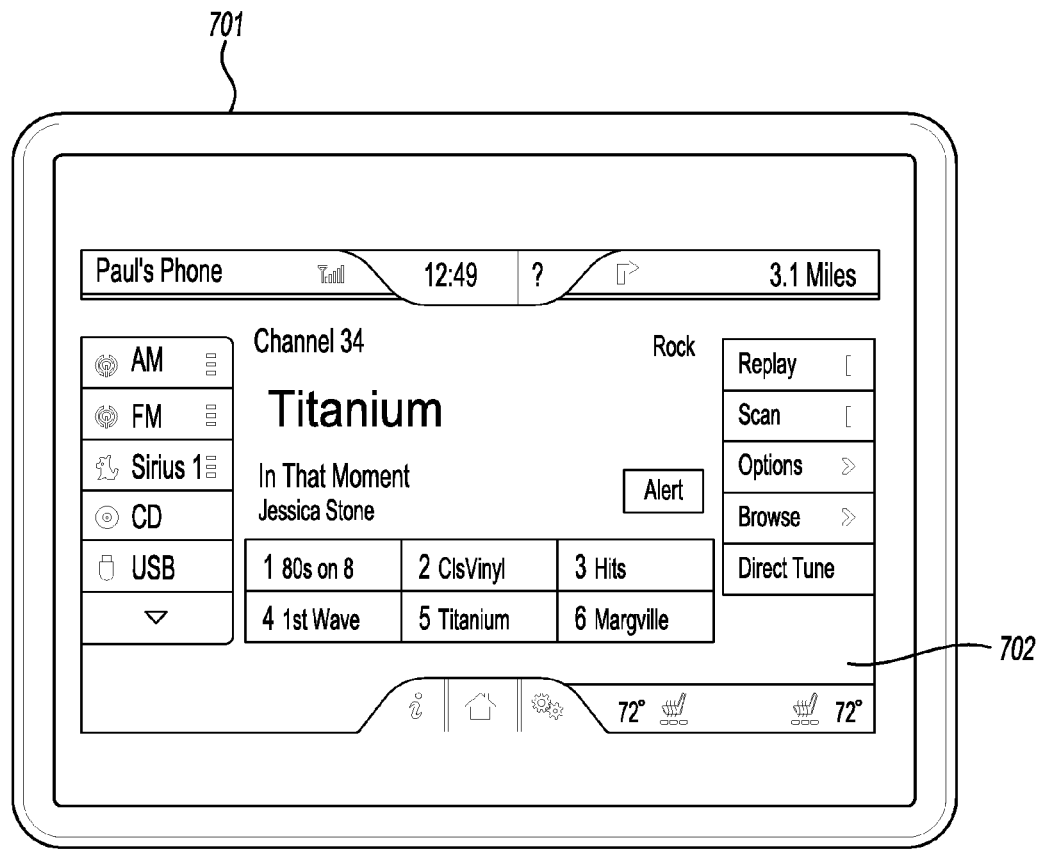
FIG. 6 is an illustrative embodiment of a human machine interface displayed on different types of nomadic devices.
Figure 6:
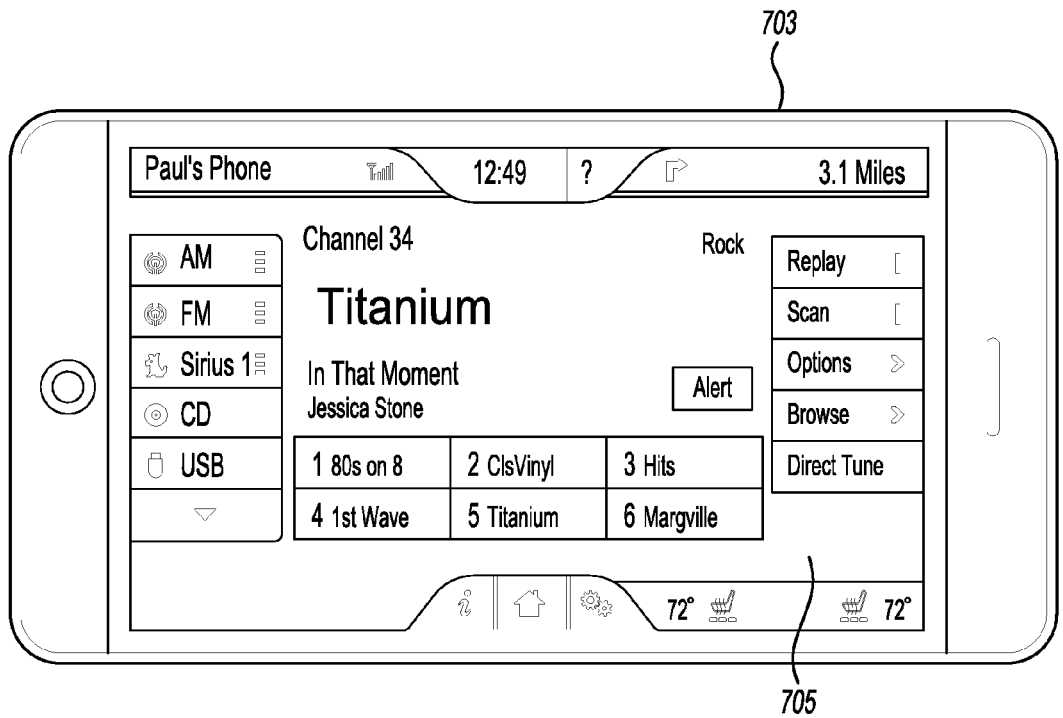

FIG. 6 is an illustrative embodiment of a human machine interface displayed on different types of nomadic devices. 701 is an example of a tablet that may connect with the vehicle server in order to operate the vehicle computer system. The interface of the nomadic device may allow for a user to control various features, such as the radio navigation, climate control, cell phone, and other features and settings. The tablet's interface 702 may mimic the interface of an in-vehicle HMI, or be tailored to specific features for the tablet. The interface may run on different operating systems, such as iOS and Android. The vehicle server may send the HMI to the tablet 701 formatted for the screen size and resolution of the tablet.

703 is an example of a cell phone that may connect with the vehicle server in order to operate the vehicle computer system. The tablet 701 and cell phone 703 may connect via a wired, short-range wireless (e.g. Bluetooth, Wi-Fi, Wi-Fi Direct), or long-range wireless (CDMA, GSM, LTE, etc). The interface 705 may be tailored to fit and display optimally on the screen of a cell phone. Although FIG. 6 illustrates an example of a cell phone and tablet being utilized to display the interface, other mobile devices may be used. This may include an MP3 player, a laptop computer, PDA, or portable gaming device.

Figure 7:
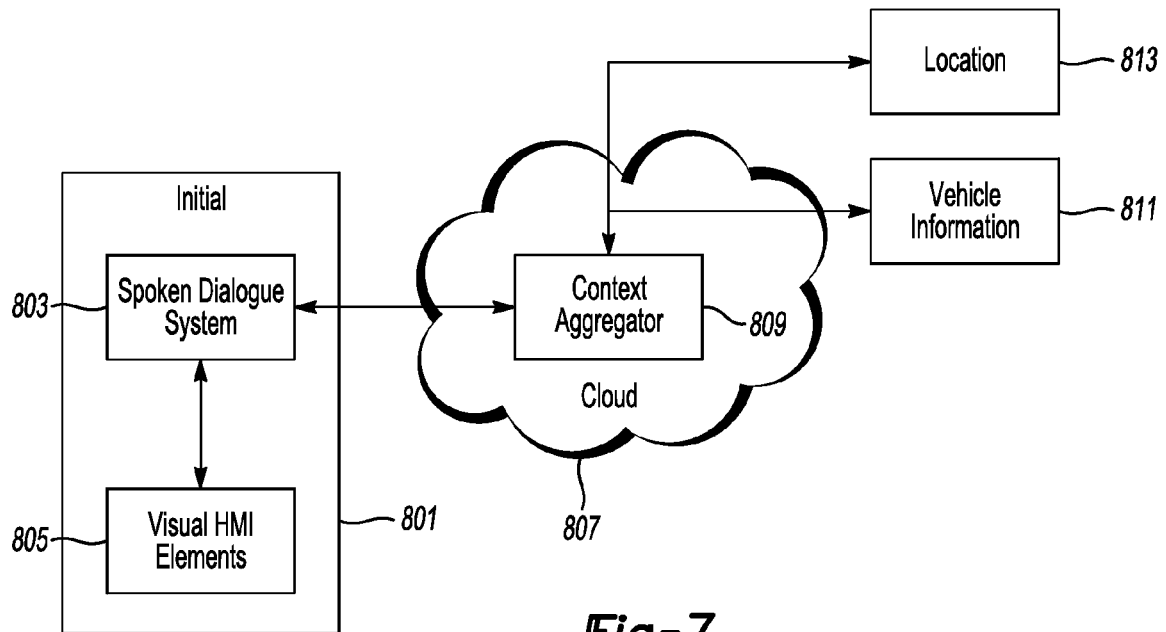
FIG. 7 illustrates an example of a query based HMI that may utilize a spoken dialogue system.

FIG. 7 illustrates an example of a query based HMI that may utilize a spoken dialogue system. The query/search based system 801 may allow for a voice recognition engine to be utilized in conjunction with the cloud server for a human machine interface environment. The query based system 801 may be in the vehicle, located on an off-board server, or utilize a hybrid combination that encompasses certain aspects of processing both on the vehicle and off-board. In he query/search based automotive HMI, a user can query for functionality or search for functionality or information utilizing the spoken dialogue system that works along with the cloud based vehicle server. The vehicle server may provide different options for the user. For example, the user can query for a multi-contour functionality and the user is offered with related visual HMI display ad an audible description of the multi-contour feature.

A spoken dialogue system 803 may output audible dialogue for a user. This may allow the user to hear a computer synthesized voice (text to speech) through the vehicle speakers and provide commands through a MIC. The dialogue system 803 may utilize various speech recognition engines to recognize the commands. Additionally, the spoken dialogue system may be off-board on another server for additional computing power. Furthermore, the spoken dialogue system 803 may be utilized in conjunction with the visual HMI elements. For example, any menu or text that is graphically displayed on the system may be operated as an available dialogue request. For example, if a graphical button states "Seek Up" on the display to change to the next radio station, the query based system 801, may allow the dialogue system 803 to output "seek up" or "next radio station" as a possible command.

Furthermore, the query based system 801 may be used in conjunction with a cloud based server 807 that utilizes a context aggregator 809 to generate different HMI commands or in conjunction with additional computing processes. By utilizing the context aggregator 809 to generate a unique spoken dialogue system 803, the aggregator 809 may receive location data 813 and other vehicle information 811 to generate a dialogue for the query based system 801. In one example, the context aggregator 809 may recognize that the vehicle has low fuel via vehicle data 811 received from the engine ECU. By utilizing location data 813, the system may know that a gas station is ahead. Thus the dialogue system 803 may ask the user "Would you like to visit the Mobile gas station ahead?" Furthermore, the visual HMI elements 805 may display the exact location of the gas station on a map, along with other intuitive information like the address or phone number. Although the embodiment illustrated shows one example, any combination of the various vehicle data and off-board data may be utilized in conjunction with the query based system 801. In one example, the user can query/search for a suitable lumbar and bolster adjustment that are offered as an option on a multi-contour seat. The spoken dialogue system can aggregate the data from a vehicle cloud server and provide suitable help for a given query.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system comprising:
a wireless transceiver configured to establish a connection with a nomadic device, wherein the wireless transceiver is further configured to send a nomadic device human machine interface (HMI) configured for output on the nomadic device using a first web browser format;
a vehicle display configured to output an in-vehicle HMI using a second web browser format for controlling various vehicle functions; and
a vehicle server configured to generate the in-vehicle HMI for the vehicle display and generate the nomadic device HMI for the nomadic device.

2. The vehicle computer system of claim 1, wherein the vehicle computer system further includes an off-board server in communication with the vehicle computer system, the off-board server configured to utilize or provide off-board data for generating the nomadic device HMI or the in-vehicle HMI.

3. The vehicle computer system of claim 2, wherein the off-board server contains one or more of off-board vehicle data, smart phone vehicle data, and vehicle human machine interface data.

4. The vehicle computer system of claim 2, wherein the off-board server is further configured to exchange data between the vehicle server utilizing web sockets.

5. The vehicle computer system of claim 2, wherein the off-board server includes a contextual data aggregator that utilizes one or more of off-board vehicle data, smart phone vehicle data, and vehicle human machine interface data to generate a contextual human machine interface to be sent to the vehicle computer system.

6. The vehicle computer system of claim 2, wherein the vehicle computer system maintains a persistent connection with the off-board server utilizing websockets.

7. The vehicle computer system of claim 1, wherein the in-vehicle HMI includes a voice-interactive interface.

8. The vehicle computer system of claim 1, wherein the vehicle server is configured to utilize a full-duplex communication channel over a single TCP connection.

9. The vehicle computer system of claim 1, wherein the connection with the nomadic device is a Wi-Fi direct connection.

10. The vehicle computer system of claim 1, wherein the first web browser format and the second web browser format are the same.

11. The vehicle computer system of claim 1, wherein the vehicle server is configured to detect a capable format of the browser and generate the nomadic device HMI or the in-vehicle HMI based on the capable format of the browser.

12. The vehicle computer system of claim 1, wherein the vehicle server is configured to support natural language query search based human machine interface.

13. An off-board computer system comprising:
a wireless transceiver communicating with a vehicle; and
a server that includes a contextual data aggregator which utilizes vehicle data retrieved from the wireless transceiver and off-board data to generate a dynamic contextual human machine interface based on the vehicle data and off-board data in a web browser data format to be sent to the vehicle utilizing the wireless transceiver.

14. The off-board computer system of claim 13, wherein the wireless transceiver is further capable of communicating with a nomadic device.

15. The off-board computer system of claim 13, wherein the dynamic contextual human machine interface includes a voice recognition menu to be sent to the vehicle.

16. The off-board computer system of claim 13, wherein the off-board data includes data received from a home server.

17. The off-board computer system of claim 13, wherein the off-board data includes media data received from a media server.

18. The off-board computer system of claim 17, wherein the media data includes music data, picture data, or video data.

19. The off-board computer system of claim 13, wherein the server is further configured to generate a language query search HMI utilizing the vehicle data and the off-board data, the query search HMI to be sent to the vehicle utilizing the wireless transceiver.

20. A vehicle computer system comprising:
a wireless transceiver configured to send a nomadic device (ND) human machine interface (HMI) to a ND in a web browser format; and
a vehicle server utilizing a contextual data aggregator that utilizes vehicle data and off-board data to generate a dynamic HMI, the server further configured to generate an in-vehicle HMI for output on a vehicle display and generate the ND HMI for the ND to display.

* * * * *